(12) United States Patent
Ishizuka et al.

(10) Patent No.: US 7,709,132 B2
(45) Date of Patent: *May 4, 2010

(54) FUEL CELL STACK

(75) Inventors: Ayumu Ishizuka, Utsunomiya (JP);
Hideaki Kikuchi, Kawachi-gun (JP); Go Morimoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 963 days.

This patent is subject to a terminal disclaimer.

(21) Appl. No.: 11/228,734

(22) Filed: Sep. 16, 2005

(65) Prior Publication Data
US 2006/0068264 A1 Mar. 30, 2006

(30) Foreign Application Priority Data
Sep. 29, 2004 (JP) .............................. 2004-283791

(51) Int. Cl.
*H01M 2/08* (2006.01)
(52) U.S. Cl. .......................................... 429/37; 429/36
(58) Field of Classification Search .................. 429/34; 16/221
See application file for complete search history.

(56) References Cited
U.S. PATENT DOCUMENTS

| | | | | |
|---|---|---|---|---|
| 3,104,415 A * | 9/1963 | Stocker | ....................... | 16/221 |
| 5,242,207 A * | 9/1993 | Carson et al. | .......... | 296/146.15 |
| 5,362,113 A * | 11/1994 | Thomas | .................... | 285/288.4 |
| 6,855,448 B2* | 2/2005 | Kikuchi et al. | ................ | 429/34 |
| 6,884,535 B2* | 4/2005 | Saito et al. | .................... | 429/34 |
| 2005/0019643 A1* | 1/2005 | Sugita et al. | .................. | 429/34 |
| 2006/0046127 A1* | 3/2006 | Ishizuka et al. | ............... | 429/34 |

FOREIGN PATENT DOCUMENTS

JP 2002-298901 10/2002

\* cited by examiner

*Primary Examiner*—Patrick Ryan
*Assistant Examiner*—Ashley Kwon
(74) *Attorney, Agent, or Firm*—Lahive & Cockfield, LLP; Anthony A. Laurentano, Esq.

(57) ABSTRACT

A side plate of a casing includes bracket members and a surface member. Each of the bracket members includes three second coupling portions and a plate-shaped attachment portion provided integrally with the second coupling portions. A coupling pin is inserted into the second coupling portions. The surface member is joined to the plate-shaped attachment portion. The bracket member includes a step fitted to an end of the surface member. The plate-shaped attachment portion and the surface member are jointed at a spot welding section including spots in a zigzag pattern.

5 Claims, 7 Drawing Sheets

FUEL CELL STACK

BACKGROUND OF THE INVENTION

1. Field of the Invention

The present invention relates to a fuel cell stack including a box-shaped casing and a stack body provided in the casing. The stack body is formed by stacking a plurality of unit cells. Each of the unit cells includes an electrolyte electrode assembly and separators sandwiching the electrolyte electrode assembly. The electrolyte electrode assembly includes a pair of electrodes, and an electrolyte interposed between the electrodes.

2. Description of the Related Art

For example, a solid polymer fuel cell employs a membrane electrode assembly which includes an anode, a cathode, and an electrolyte membrane (electrolyte) interposed between the anode and the cathode. The electrolyte membrane is a polymer ion exchange membrane. The membrane electrode assembly and separators sandwiching the membrane electrode assembly make up a unit of a fuel cell (unit cell) for generating electricity.

In the fuel cell, a fuel gas such as a gas chiefly containing hydrogen (hereinafter also referred to as the "hydrogen-containing gas") is supplied to the anode. A gas chiefly containing oxygen or air (hereinafter also referred to as the "oxygen-containing gas") is supplied to the cathode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electrical energy.

Generally, a predetermined number of, e.g., several tens to several hundreds of fuel cells are stacked together to form a fuel cell stack for achieving the desired level of electricity in power generation. Components of the fuel cell stack need to be tightened together reliably under pressure so that the internal resistance of the fuel cell does not increase, and the sealing performance for preventing leakage of reactant gases is maintained.

In this regard, for example, a fuel cell stack disclosed in Japanese Laid-Open Patent Publication No. 2002-298901 is known. The fuel cell stack includes a stack body formed by stacking a predetermined number of unit cells. Current collecting electrodes (terminal plates) are provided outside the stack body. Further, end plates are stacked on the outside of the terminal plates. The end plates are joined to the casing by hinge mechanisms. The casing includes a plurality of panels (side plates) provided on upper, lower, left, and right sides between the end plates.

Thus, in the conventional technique, the number of components is reduced effectively, and it is possible to use thin end plates. It is possible to reduce the size and the weight of the entire fuel cell stack easily.

In the conventional technique, for example, as shown in FIG. 7, at longitudinal opposite ends of a panel 1 of the casing, a plurality of cylindrical insertion portions 4a to 4c are provided. Coupling pins 3 of hinge mechanisms 2 are inserted in the insertion portions 4a to 4c at the opposite ends of the panel 1. At this time, typically, the insertion portions 4a to 4c are joined to the opposite ends of a surface member 5 of the panel 1 by laser welding or the like.

However, since the insertion portions 4a to 4c are joined to the ends of the surface member 5 individually, it is considerably difficult to form insertion holes 6a to 6c of the insertion portions 4a to 4c coaxially, i.e., in alignment with each other. If the insertion holes 6a to 6c are not in alignment with each other, the coupling pin 3 cannot be inserted into the insertion holes 6a to 6c. Thus, the assembling operation of the hinge mechanism 2 cannot be performed efficiently. Further, when a load is applied to the casing, a bending moment is applied to the panel 1, and the strength of the hinge mechanism 2 is lowered.

SUMMARY OF THE INVENTION

A general object of the present invention is to provide a fuel cell stack which is assembled while keeping cylindrical insertion portions in alignment with each other for inserting a coupling pin into the cylindrical insertion portions, and the desired casing is produced efficiently by simple operation.

The present invention relates to a fuel cell stack including a box-shaped casing and a stacked body provided in the casing. The stack body is formed by stacking a plurality of unit cells. Each of the unit cells includes an electrolyte electrode assembly and separators sandwiching the electrolyte electrode assembly. The electrolyte electrode assembly includes a pair of electrodes, and an electrolyte interposed between the electrodes.

The casing comprises end plates provided at opposite ends of the stack body in the stacking direction, a plurality of side plates provided on sides of the stack body, and a coupling pin for coupling the end plate and the side plate. The side plate comprises a bracket member including a plurality of cylindrical insertion portions and a plate-shaped attachment portion provided integrally with the cylindrical insertion portions, and a surface member forming a side surface of the casing. The coupling pin is inserted into the cylindrical coupling portions. The surface member is joined to the plate-shaped attachment portion.

Preferably, the bracket member includes a step contacting an end of the surface member for positioning the bracket member and the surface member relative to each other. In the structure, by fitting the step of the bracket member to the end of the surface member, the bracket member and the surface member are positioned relative to each other simply and reliably.

Further, preferably, the center of a hole of the cylindrical insertion portion is positioned on the neutral surface of the side plate. The neutral surface of the first plate herein means a surface in which the theoretical stress and distortion is estimated to be "0 (zero)" (a surface in which no compression occurs) when a bending stress is applied to the side plate, assuming that the deformation in the cross section of the side plate is very small. In the structure, when a load is applied to the coupling pin in the stacking direction, no force in the bending direction is applied to the side plate.

Further, preferably, the plate-shaped attachment portion and the surface member are joined at a spot welding section including spots arranged in a plurality of lines. In the structure, the strength of joining the plate-shaped attachment portion and the surface member is improved. Further, when a load is applied to the coupling pin in the stacking direction, the load points are not focused locally.

In the present invention, the cylindrical insertion portions are provided integrally with the plate-shaped attachment portion, and the coupling pin is inserted into the cylindrical portions. In the structure, it is possible to reliably provide the cylindrical insertion portions in alignment with each other. Thus, simply by joining the plate-shaped attachment portion and the surface member, without causing any axial deviation between the cylindrical insertion portions and the coupling pin, it is possible to efficiently assemble the desired side plate easily.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
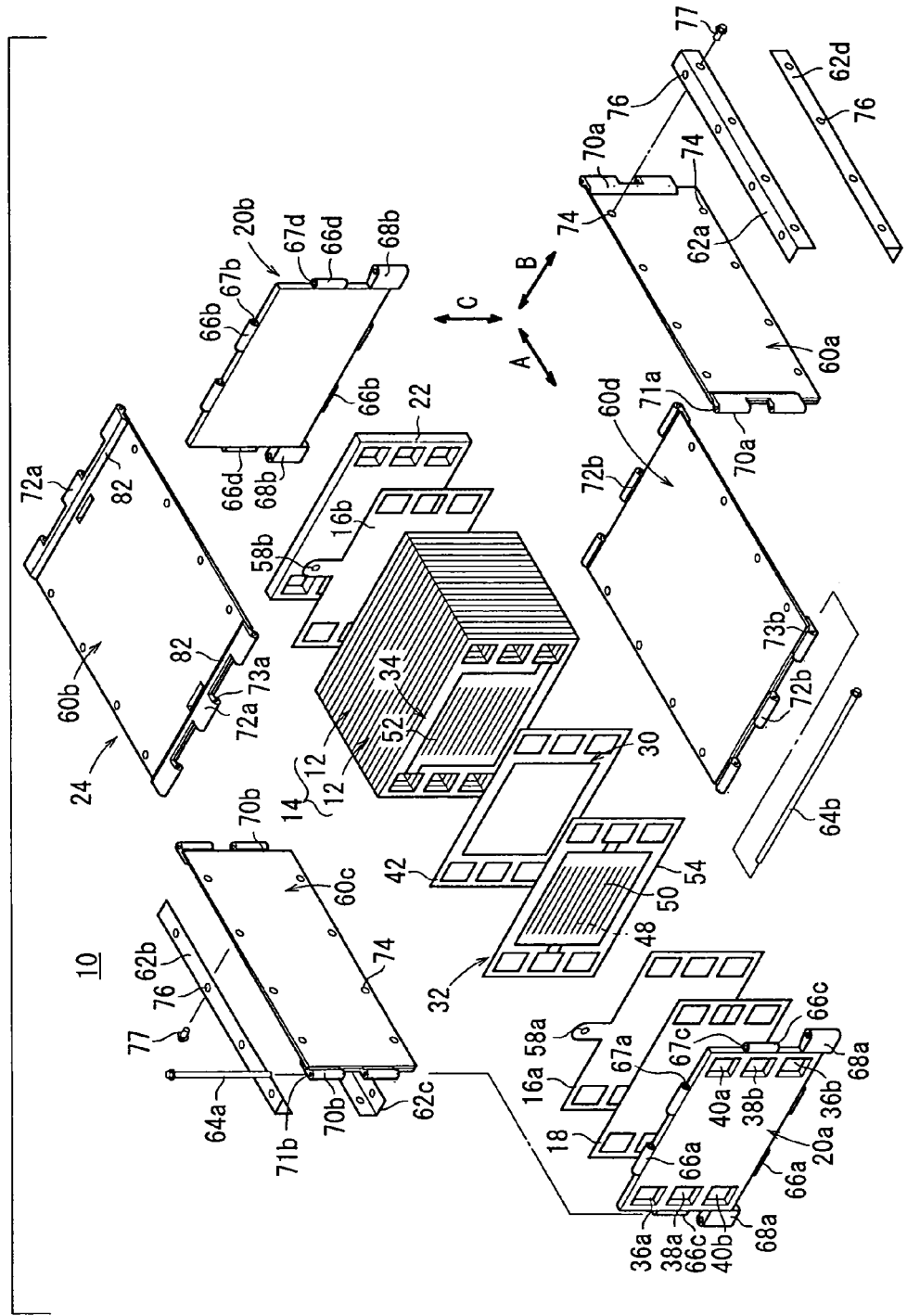
FIG. 1 is a partial exploded perspective view schematically showing a fuel cell stack according to an embodiment of the present invention.
Figure 2:
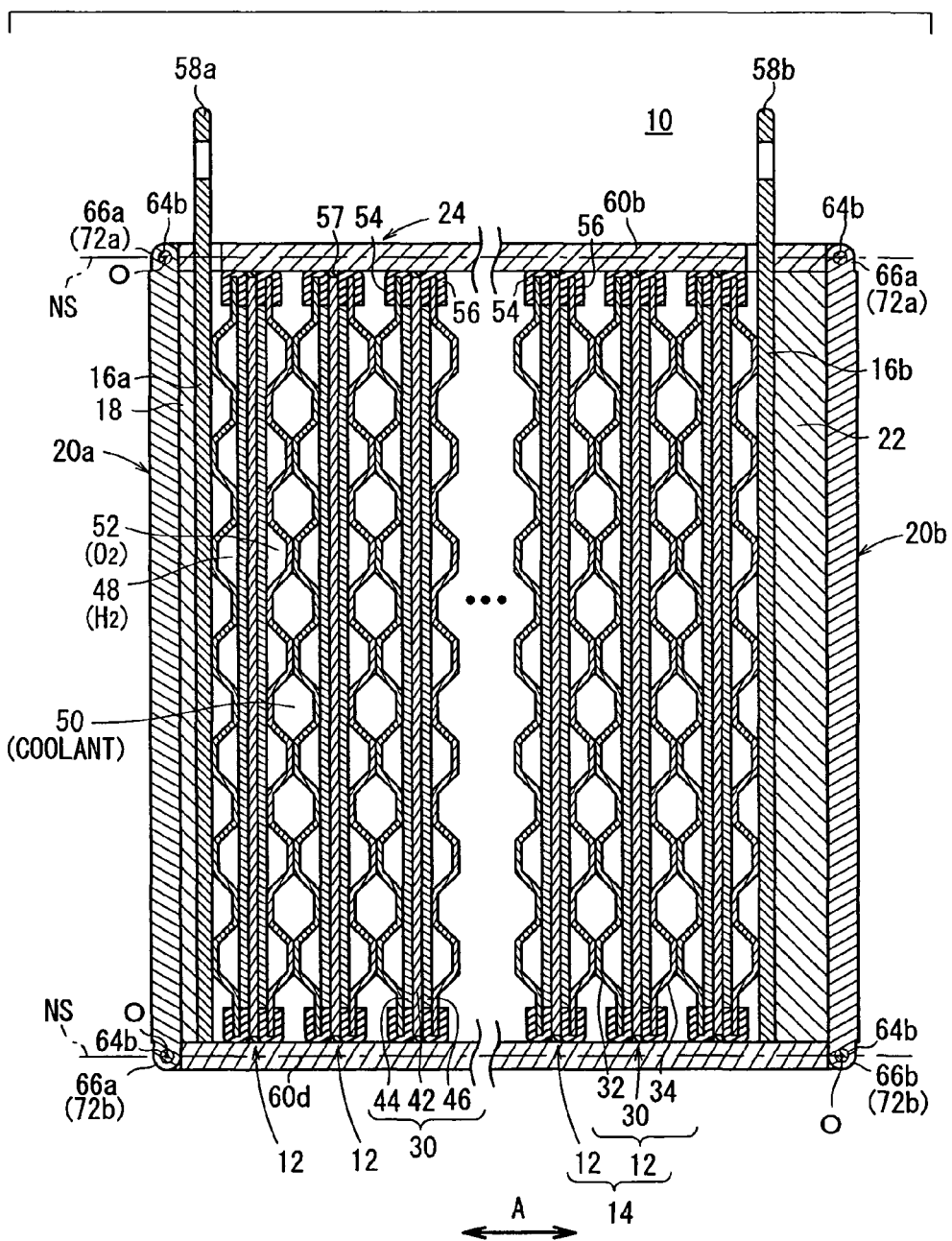
FIG. 2 is a cross sectional side view showing the fuel cell stack.

FIG. 1 is a partial exploded perspective view schematically showing a fuel cell stack 10 according to an embodiment of the present invention. FIG. 2 is a cross sectional side view showing part of the fuel cell stack 10.

The fuel cell stack 10 includes a stack body 14 formed by stacking a plurality of unit cells 12 horizontally in a stacking direction indicated by an arrow A. At one end of the stack body 14 in the stacking direction indicated by the arrow A, a terminal plates 16a is provided. An insulating plate 18 is provided outside the terminal plate 16a. Further, an end plate 20a is provided outside the insulating plate 18. At the other end of the stack body 14 in the stacking direction, a terminal plate 16b is provided. An insulating spacer member 22 is provided outside the terminal plate 16b. Further, an end plate 20b is provided outside the insulating spacer member 22. Each of the end plates 20a, 20b has a rectangular shape. The fuel cell stack 10 is assembled together such that the stack body 14 formed by stacking the unit cells 12 is housed in a casing 24 including the end plates 20a, 20b.

Figure 3:
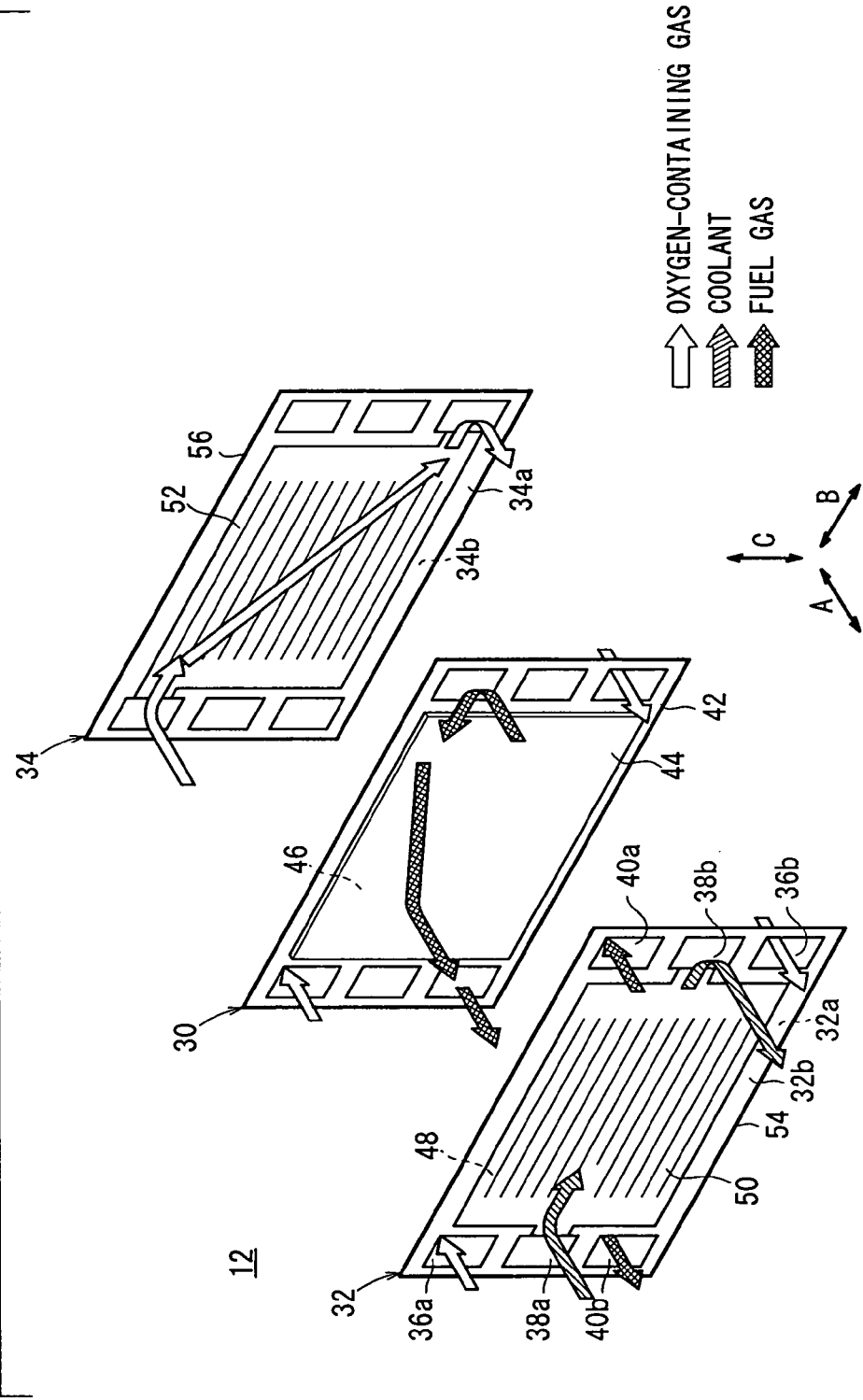
FIG. 3 is an exploded perspective view showing a unit cell of the fuel cell stack.

As shown in FIGS. 2 and 3, each of the unit cells 12 includes a membrane electrode assembly (electrolyte electrode assembly) 30 and thin corrugated plates as first and second metal separators 32, 34 sandwiching the membrane electrode assembly 30. Instead of using the first and second metal separators 32, 34, for example, carbon separators may be used.

At one end of the unit cell 12 in a longitudinal direction indicated by an arrow B in FIG. 3, an oxygen-containing gas supply passage 36a for supplying an oxygen-containing gas, a coolant supply passage 38a for supplying a coolant, and a fuel gas discharge passage 40b for discharging a fuel gas such as a hydrogen-containing gas are provided. The oxygen-containing gas supply passage 36a, the coolant supply passage 38a, and the fuel gas discharge passage 40b extend through the unit cell 12 in the direction indicated by the arrow A.

At the other end of the unit cell 12 in the longitudinal direction, a fuel gas supply passage 40a for supplying the fuel gas, a coolant discharge passage 38b for discharging the coolant, and an oxygen-containing gas discharge passage 36b for discharging the oxygen-containing gas are provided. The fuel gas supply passage 40a, the coolant discharge passage 38b, and the oxygen-containing gas discharge passage 36b extend through the unit cell 12 in the direction indicated by the arrow A.

The membrane electrode assembly 30 includes an anode 44, a cathode 46, and a solid polymer electrolyte membrane 42 interposed between the anode 44 and the cathode 46. The solid polymer electrolyte membrane 42 is formed by impregnating a thin membrane of perfluorosulfonic acid with water, for example.

Each of the anode 44 and the cathode 46 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 44 and the electrode catalyst layer of the cathode 46 are fixed to both surfaces of the solid polymer electrolyte membrane 42, respectively.

The first metal separator 32 has a fuel gas flow field 48 on its surface 32a facing the membrane electrode assembly 30. The fuel gas flow field 48 is connected to the fuel gas supply passage 40a at one end, and connected to the fuel gas discharge passage 40b at the other end. The fuel gas flow field 48 includes a plurality of grooves extending in the direction indicated by the arrow B, for example. Further, the first metal separator 32 has a coolant flow field 50 on the other surface 32b. The coolant flow field 50 is connected to the coolant supply passage 38a at one end, and connected to the coolant discharge passage 38b at the other end. The coolant flow field 50 includes a plurality of grooves extending in the direction indicated by the arrow B.

The second metal separator 34 has an oxygen-containing gas flow field 52 on its surface 34a facing the membrane electrode assembly 30, for example. The oxygen-containing gas flow field 52 is connected to the oxygen-containing gas supply passage 36a at one end, and connected to the oxygen-containing gas discharge passage 36b at the other end. The oxygen-containing gas flow field 52 includes a plurality of grooves extending in the direction indicated by the arrow B. The other surface 34b of the second metal separator 34 is stacked on the surface 32b of the adjacent first metal separator 32. When the first metal separator 32 and the second metal separator 34 are stacked together, the coolant flow field 50 is formed between the surface 32b of the first metal separator 32 and the surface 34b of the second metal separator 34.

A first seal member 54 is formed integrally on the surfaces 32a, 32b of the first metal separator 32 around the outer end of the first metal separator 32. On the surface 32a, the first seal member 54 is formed around the fuel gas supply passage 40a, the fuel gas discharge passage 40b, and the fuel gas flow field 48 for preventing leakage of the fuel gas, while allowing the fuel gas to flow between the fuel gas supply passage 40a and the fuel gas flow field 48, and between the fuel gas flow field 48 and the fuel gas discharge passage 40b. Further, on the surface 32b, the first seal member 54 is formed around the coolant supply passage 38a, the coolant discharge passage 38b, and the coolant flow field 50 for preventing leakage of the coolant, while allowing the coolant to flow between the coolant supply passage 38a and the coolant flow field 50, and between the coolant flow field 50 and the coolant discharge passage 38b.

A second seal member 56 is formed integrally on the surfaces 34a, 34b of the second metal separator 34 around the outer end of the second metal separator 34. On the surface 34a, the second seal member 56 is formed around the oxygen-containing gas supply passage 36a, the oxygen-containing gas discharge passage 36b, and the oxygen-containing gas flow field 52, and prevents leakage of the oxygen-containing gas, while allowing the oxygen-containing gas to flow between the oxygen-containing gas supply passage 36a and the oxygen-containing gas flow field 52, and between the oxygen-containing gas flow field 52 and the oxygen-containing gas discharge passage 36b. Further, on the surface 34b, the second seal member 56 is formed around the coolant supply passage 38a, the coolant discharge passage 38b, and the coolant flow field 50, and prevents leakage of the coolant while allowing the coolant to flow between the coolant supply passage 38a and the coolant flow field 50, and between the coolant flow field 50 and the coolant discharge passage 38b.

As shown in FIG. 2, a seal 57 is interposed between the first seal member 54 and the second seal member 56. Therefore, the outer circumference of the solid polymer electrolyte membrane 42 does not directly contact the casing 24.

As shown in FIGS. 1 and 2, plate-shaped terminals 58a, 58b extend straight in the surface direction from the terminal plates 16a, 16b, respectively. The terminals 58a, 58b are connected to a load such as a motor of a vehicle.

As shown in FIG. 1, the casing 24 includes the end plates 20a, 20b, a plurality of side plates 60a to 60d, angle members (e.g., L-angles) 62a to 62d, and coupling pins 64a, 64b. The side plates 60a to 60d are provided on sides of the stack body 14. The angle members 62a to 62d are used for coupling adjacent ends of the side plates 60a to 60d. The coupling pins 64a, 64b are used for coupling the end plates 20a, 20b and the side plates 60a to 60d. The coupling pins 64b are longer than the coupling pins 64a. The side plates 60a to 60d are thin metal plates.

Each of upper and lower ends of the end plate 20a has two first coupling portions (cylindrical insertion portions) 66a. Each of upper and lower ends of the end plate 20b has two first coupling portions (cylindrical insertion portions) 66b. Each of left and right ends of the end plate 20a has one first coupling portion (cylindrical insertion portion) 66c. Each of left and right ends of the end plate 20b has one first coupling portion (cylindrical insertion portion) 66d. The first coupling portions 66a to 66d have through holes 67a to 67d, respectively. The end plate 20a has mounting bosses 68a on its left and right ends at lower positions. The end plate 20b has mounting bosses 68b on its left and right ends at lower positions. The bosses 68a, 68b are fixed to mounting positions (not shown) using bolts or the like for installing the fuel cell stack 10 in a vehicle, for example.

The side plates 60a, 60c are provided on opposite sides of the stack body 14 in the direction indicated by the arrow B. Each end of the side plate 60a in the longitudinal direction indicated by the arrow A has two second coupling portions (cylindrical insertion portions) 70a. Each end of the side plate 60c in the longitudinal direction indicated by the arrow A has two second coupling portions (cylindrical insertion portions) 70b. The second coupling portions 70a, 70b have holes 71a, 71b, respectively. The side plate 60b is provided on the upper side of the stack body 14, and the side plate 60d is provided on the lower side of the stack body 14. Each longitudinal end of the side plate 60b has three second coupling portions (cylindrical insertion portions) 72a. Each longitudinal end of the side plate 60d has three second coupling portions (cylindrical insertion portions) 72b. The second coupling portions 72a, 72b have holes 73a, 73b, respectively.

In assembling the end plates 20a, 20b and the side plates 60a to 60d, the first coupling portions 66c of the end plate 20a, and the first coupling portions 66d of the end plate 20b are positioned between the second coupling portions 70a of the side plate 60a, and between the second coupling portions 70b of the side plate 60c. The short coupling pins 64a are inserted into these coupling portions 66c, 66d, 70a, 70b for coupling the side plates 60a, 60c, and the end plates 20a, 20b.

Likewise, the second coupling portions 72a of the side plate 60b and the first coupling portions 66a, 66b of the upper end of the end plates 20a, 20b are positioned alternately, and the second coupling portions 72b of the side plate 60d and the first coupling portions 66a, 66b of the lower end of the end plates 20a, 20b are positioned alternately. The long coupling pins 64b are inserted into these coupling portions 66a, 66b, 72a, 72b for coupling the side plates 60b, 60d, and the end plates 20a, 20b.

A plurality of screw holes 74 are formed along opposite lateral edges of the side plates 60a to 60d. The screw holes 74 are arranged in the direction indicated by the arrow A. Further, holes 76 are provided along the lengths of the angle members 62a to 62d at positions corresponding to the screw holes 74. Screws 77 are inserted into the holes 76 and the screw holes 74 to fix the side plates 60a to 60d together using the angle members 62a to 62d. In this manner, the side plates 60a to 60d, and the end plates 20a, 20b are assembled into the casing 24 (see FIG. 4).

Alternatively, angle members 62a to 62d have screw holes, and the side plates 60a to 60d have holes. In this case, the angle members 62a to 62d are placed inside the side plates 60a to 60d for fixing the angle members 62a to 62d and the side plates 60a to 60d together by screws.

Figure 5:
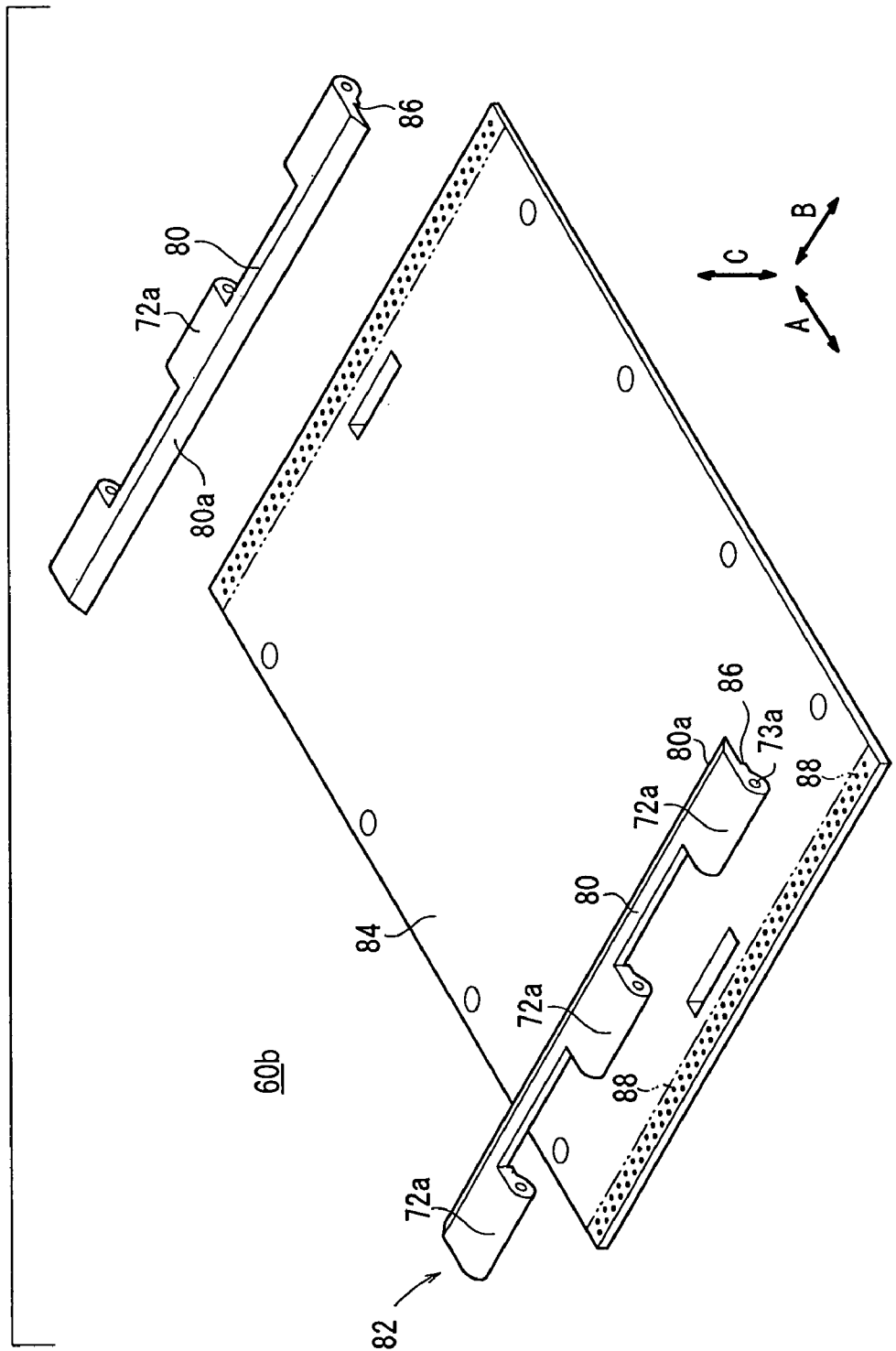
FIG. 5 is an exploded perspective view showing a side plate of a casing.
Figure 6:
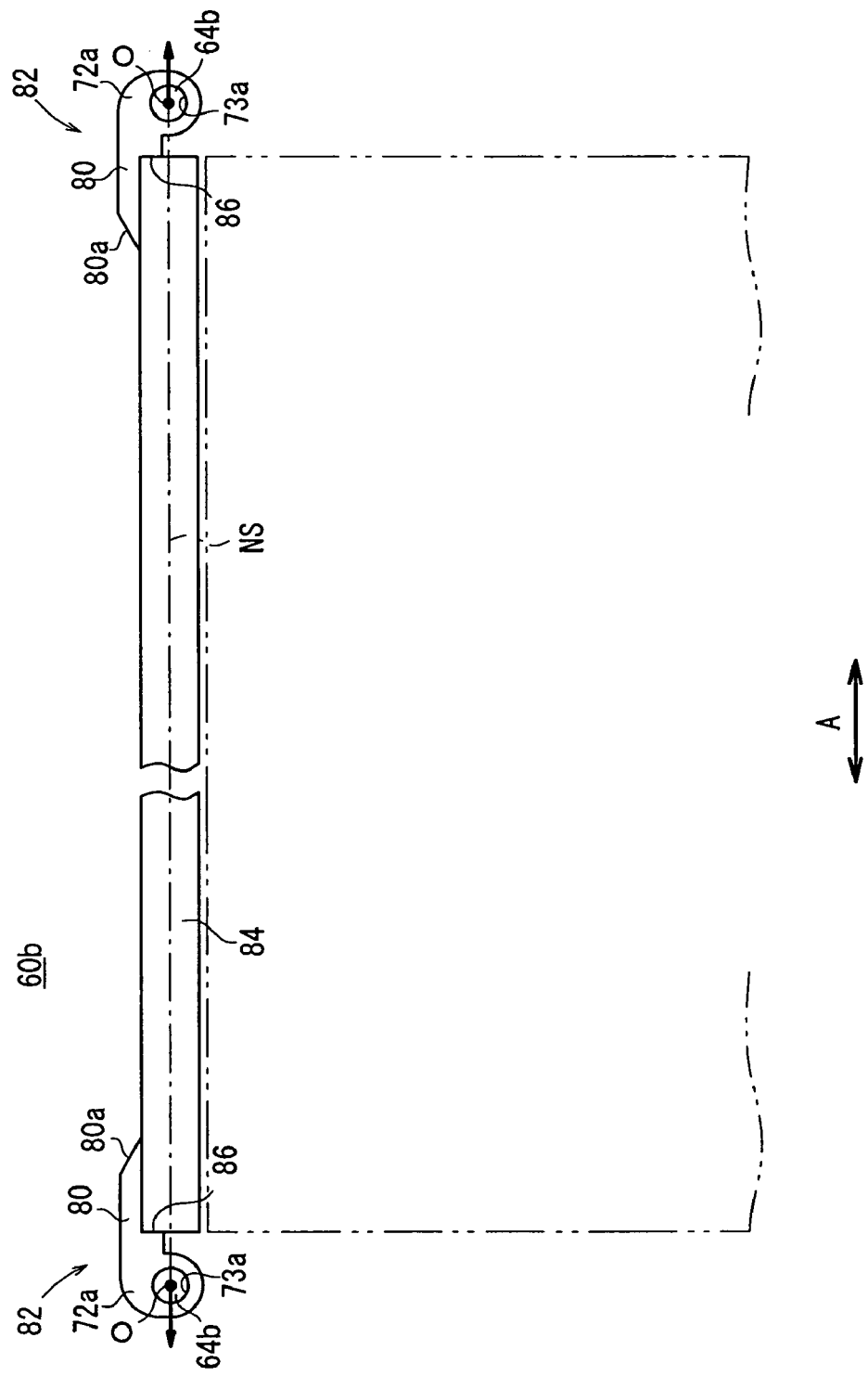
FIG. 6 is a view showing the side plate of the casing.
Figure 7:
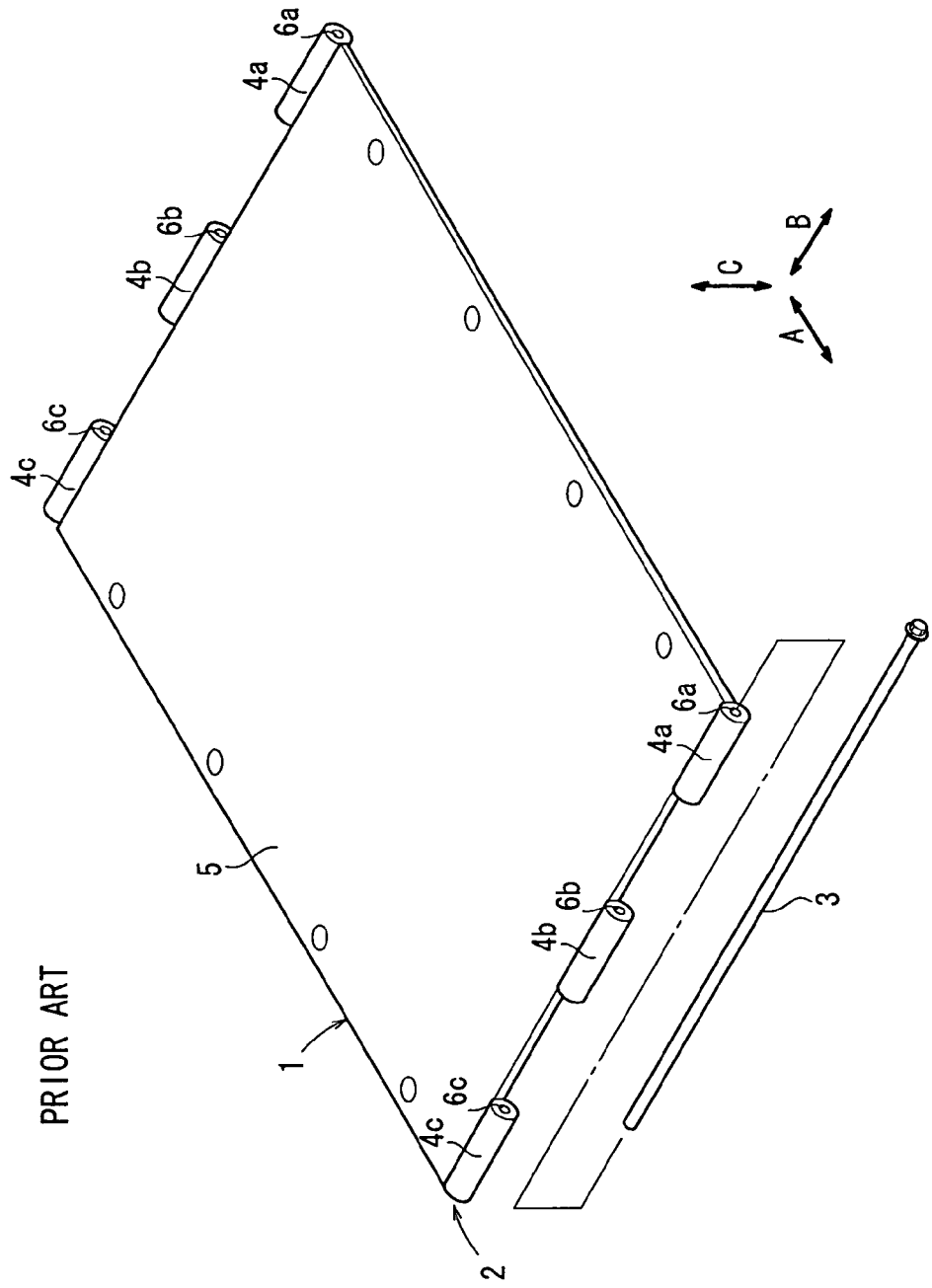
FIG. 7 is a perspective view showing a panel of a conventional fuel cell stack.

As shown in FIGS. 5 and 6, the side plate 60b includes bracket members 82 and a surface member 84. Each of the bracket members 82 includes the three second coupling portions 72a and a plate-shaped attachment portion 80 provided integrally with the second coupling portions 72a. The coupling pin 64b is inserted into the second coupling portions 72a. The surface member 84 forms a side surface of the casing 24, and is jointed to the plate-shaped attachment portion 80. A taper surface 80a is formed at the edge of the plate-shaped attachment portion 80 as necessary.

The bracket members 82 have steps 86, respectively. The steps 86 contact the opposite ends of the surface member 84 in the direction indicated by the arrow A for positioning the bracket member 82 relative to the surface member 84. The plate-shaped attachment portion 80 of the bracket member 82 and the surface member 84 are joined at a spot welding section 88 including a plurality of spots in a plurality of, e.g., two lines, in a zigzag pattern (see FIG. 5).

As shown in FIG. 6, the center O of the hole 73a of the second coupling portion 72a is positioned on the neutral surface NS of the side plate 60b. A load in the direction indicated by the arrow A is applied to the pair of coupling pins 64b. Therefore, no force in a bending direction is applied to the side plate 60b.

As shown in FIG. 1, the structure of the side plate 60a, 60c and 60d is the same as the above-mentioned structure of the side plate 60b, and detailed description thereof is omitted. Further, as necessary, the structure of the side end plate 20a, 20b may be the same as the structure of the side plate 60b.

As shown in FIGS. 1 and 2, the spacer member 22 has a rectangular shape having predetermined dimensions such that the spacer member 22 is positioned inside the casing 24. The thickness of the spacer member 22 is selected such that the dimensional variation in the stacking direction of the stack body 14 is absorbed, and the desired tightening force is applied to the stack body 14. If it is possible to absorb variation of the length in the stacking direction of the stack body 14 by elasticity of the first and second metal separators 32, 34, the spacer members 22 may not be used.

Next, operation of the fuel cell stack 10 will be described.

Figure 4:
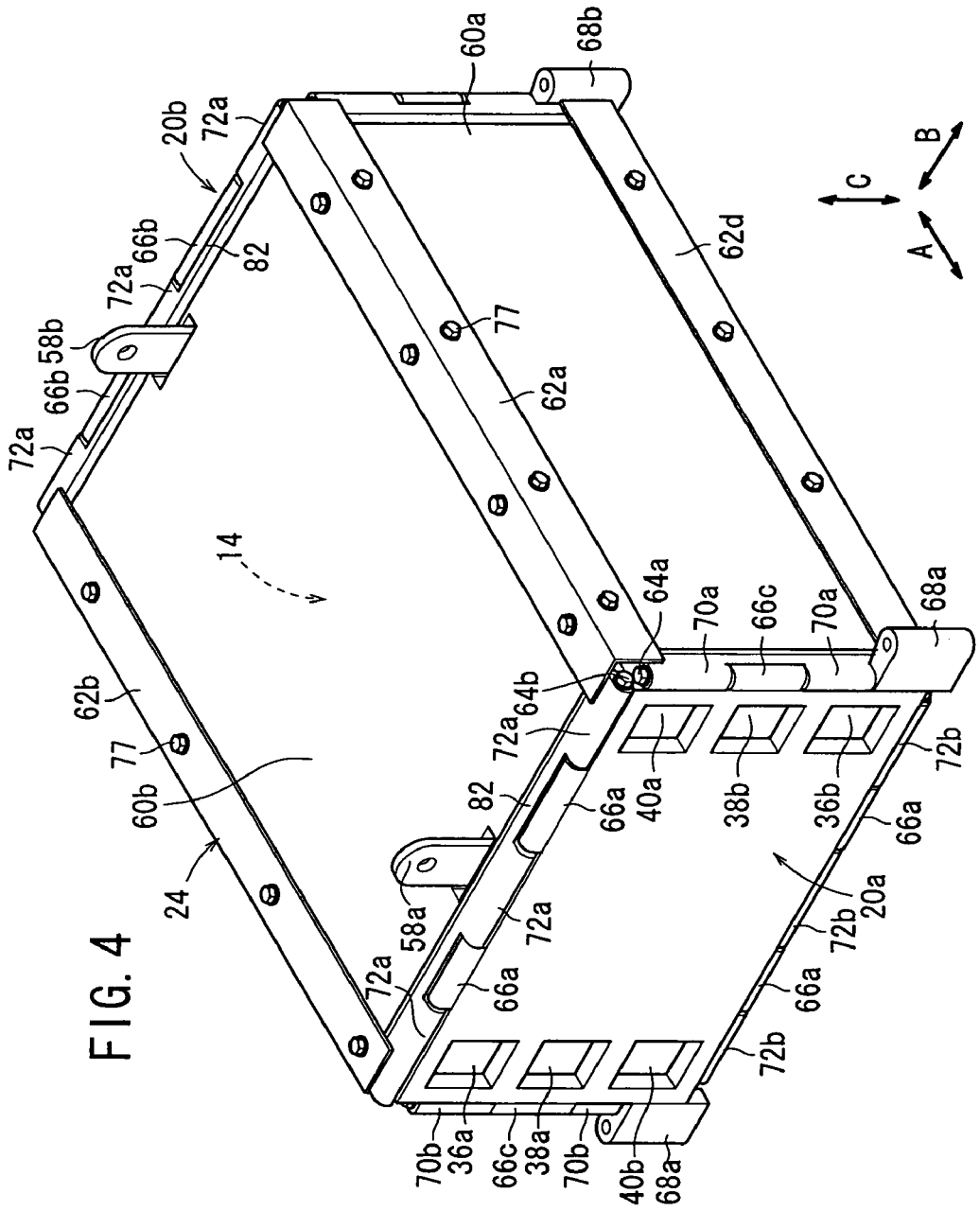
FIG. 4 is a perspective view showing the fuel cell stack.

In the fuel cell stack 10, as shown in FIG. 4, an oxygen-containing gas is supplied to the oxygen-containing gas supply passage 36a from the end plate 20a of the fuel cell stack 10. A fuel gas such as a hydrogen-containing gas is supplied to the fuel gas supply passage 40a. Further, a coolant such as pure water, an ethylene glycol is supplied to the coolant supply passage 38a. Thus, the oxygen-containing gas, the fuel gas, and the coolant are supplied to each of the unit cells 12 stacked together in the direction indicated by the arrow A to form the stack body 14. The oxygen-containing gas, the fuel gas, and the coolant flow in the direction indicated by the arrow A.

As shown in FIG. 3, the oxygen-containing gas flows from the oxygen-containing gas supply passage 36a into the oxygen-containing gas flow field 52 of the second metal separator 34. The oxygen-containing gas flows along the cathode 46 of the membrane electrode assembly 30 for inducing an electrochemical reaction at the cathode 46. The fuel gas flows from the fuel gas supply passage 40a into the fuel gas flow field 48 of the first metal separator 32. The fuel gas flows along the anode 44 of the membrane electrode assembly 30 for inducing an electrochemical reaction at the anode 44.

Thus, in each of the membrane electrode assemblies 30, the oxygen-containing gas supplied to the cathode 46, and the fuel gas supplied to the anode 44 are consumed in the electrochemical reactions at catalyst layers of the cathode 46 and the anode 44 for generating electricity.

After the oxygen in the oxygen-containing gas is consumed at the cathode 46, the oxygen-containing gas flows into the oxygen-containing gas discharge passage 36b, and is discharged to the outside from the end plate 20a. Likewise, after the fuel gas is consumed at the anode 44, the fuel gas flows into the fuel gas discharge passage 40b, and is discharged to the outside from the end plate 20a.

The coolant flows from the coolant supply passage 38a into the coolant flow field 50 between the first and second metal separators 32, 34, and flows in the direction indicated by the arrow B. After the coolant is used for cooling the membrane electrode assembly 30, the coolant flows into the coolant discharge passage 38b, and is discharged to the outside from the end plate 20a.

In the embodiment of the present invention, for example, the side plate 60b is formed by joining the bracket members 82 and the surface member 84. As shown in FIGS. 5 and 6, each of the bracket members 82 includes the three second coupling portions 72a and the plate-shaped attachment portion 80 provided integrally with the second coupling portions 72a. The coupling pin 64b is inserted into the second coupling portions 72a. In the structure, it is possible to reliably provide the three second coupling portions 72a in alignment with each other.

Thus, simply by joining the plate-shaped attachment portion 80 and the surface member 84, without causing any axial deviation between the three second coupling portions 72a and the coupling pin 64b, it is possible to efficiently assemble the desired side plate 60b easily.

Further, in the embodiment of the present invention, the bracket member 82 has the step 86. Therefore, simply by fitting the step 86 to the end of the surface member 84, the bracket member 82 and the surface member 84 are positioned relative to each other simply and reliably. Thus, improvement in the assembling operation of the side plate 60b is achieved.

Further, the plate-shaped attachment portion 80 of the bracket member 82 and the surface member 84 are joined at the spot welding section 88 comprising spots in a zigzag pattern. Thus, the strength of joining the plate-shaped attachment portion 80 and the surface member 84 is improved.

Further, when a load is applied to the coupling pin 64b in the stacking direction, the load points are not focused locally.

Further, the center O of the hole 73a of the second coupling portion 72a is provided on the neutral surface NS of the side plate 60b (see FIG. 6). Thus, when a load in the stacking direction of the stack body 14 is applied to the opposite ends of the side plate 60b in the direction indicated by the arrow A through the coupling pins 64b, it is possible to reliably prevent the bending force from being applied to the side plate 60d.

When the bending force applied to the side plate 60b is limited to be small, the center O of the hole 73a of the second coupling portion 72a may be offset slightly from the neutral surface NS of the side plate 60b.

Further, in the side plates 60a, 60c and 60d, the same advantages as with the side plate 60b can be obtained.

While the invention has been particularly shown and described with reference to a preferred embodiment, it will be understood that variations and modifications can be effected thereto by those skilled in the art without departing from the spirit and scope of the invention as defined by the appended claims.

What is claimed is:

1. A fuel cell stack comprising:
   a box-shaped casing; and
   a stack body provided in said casing, said stack body being formed by stacking a plurality of unit cells, said unit cells each including an electrolyte electrode assembly and separators sandwiching said electrolyte electrode assembly, said electrolyte electrode assembly including a pair of electrodes, and an electrolyte interposed between said electrodes, wherein said casing comprises:
   end plates provided at opposite ends of said stack body in the stacking direction;
   a plurality of side plates provided on sides of said stack body; and
   a coupling pin for coupling said end plate and said side plate, and wherein said side plate comprises:
   a bracket member including a plurality of cylindrical insertion portions and a plate-shaped attachment portion provided integrally with said cylindrical insertion portions, said coupling pin being inserted into said cylindrical coupling portions, the bracket member being provided at each end of said side plate in the stacking direction of the unit cells; and
   a surface member forming a side surface of said casing, said plate-shaped attachment portion of said bracket member being joined to said surface member so that said plate-shaped attachment portion is superposed on said surface member at a side opposite to the stack body, and
   wherein a thickness of said side plate where said plate-shaped attachment portion of said bracket member is superposed on said surface member is greater than a thickness of said side plate at a portion free of said plate-shaped attachment portion:
   wherein said bracket member includes a step contacting an end of said surface member for positioning said bracket member and said surface member relative to each other,
   wherein the end plates integrally include end-plate-side cylindrical insertion portions,
   wherein the bracket member abuts against the surface member at an end surface of the surface member and at the side of the surface member opposite to the stack body.

2. A fuel cell stack according to claim 1, wherein the center of a hole of said cylindrical insertion portion is positioned on the neutral surface of said side plate.

3. A fuel cell stack according to claim 1, wherein said plate-shaped attachment portion and said surface member are joined at a spot welding section including spots arranged in a plurality of lines.

4. A fuel cell stack according to claim 1, wherein at least one cylindrical insertion portion is provided integrally with said end plate, said coupling pin being inserted into said cylindrical insertion portions; and said cylindrical insertion portions of said end plate and said cylindrical insertion portions of said side plate are arranged alternately, and in alignment with each other.

5. A fuel cell stack according to claim 1, wherein a taper surface is formed at an edge of said plate-shaped attachment portion.

* * * * *